US010545398B2

(12) United States Patent
Cheng et al.

(10) Patent No.: US 10,545,398 B2
(45) Date of Patent: Jan. 28, 2020

(54) PROJECTION DEVICE WITH ADJUSTING STRUCTURE FOR MOVING DIRECTIONS OF PROJECTION IMAGE

(71) Applicant: Coretronic Corporation, Hsin-Chu (TW)

(72) Inventors: Chuan-Te Cheng, Hsin-Chu (TW); Yen-Lin Chen, Hsin-chu (TW); Chih-Wei Shih, Hsin-Chu (TW); Chin-Sheng Chao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/136,279

(22) Filed: Sep. 20, 2018

(65) Prior Publication Data

US 2019/0196319 A1 Jun. 27, 2019

(30) Foreign Application Priority Data

Dec. 21, 2017 (CN) .......................... 2017 1 1394457

(51) Int. Cl.
*G03B 21/28* (2006.01)
*G02B 27/01* (2006.01)
(Continued)

(52) U.S. Cl.
CPC .......... *G03B 21/28* (2013.01); *G02B 27/0172* (2013.01); *G03B 21/142* (2013.01); *G03B 35/20* (2013.01)

(58) Field of Classification Search
CPC .... G03B 21/28; G03B 21/145; G03B 21/147; G03B 21/208; G03B 21/2066;
(Continued)

(56) References Cited

U.S. PATENT DOCUMENTS 5,430,575 A 7/1995 Sudarshan et al.
7,576,916 B2 8/2009 Amitai
(Continued)

FOREIGN PATENT DOCUMENTS

CN 102314059 1/2012
CN 103365057 10/2013
(Continued)

OTHER PUBLICATIONS

"Office Action of Taiwan Counterpart Application," dated Aug. 9, 2018, pp. 1-5.
(Continued)

*Primary Examiner* — Sultan Chowdhury
(74) *Attorney, Agent, or Firm* — JCIPRNET

(57) ABSTRACT

A projection device including at least one projection module, at least one reflecting element, and at least one adjusting structure is provided. The projection module has at least one optical axis. The projection module is adapted to provide a projection beam. The projection beam is transmitted along a light transmission path to a projection target to form a projection image. The reflecting element is disposed between the at least one projection module and the projection target and located on the optical axis and has a reflecting surface, wherein the reflecting surface is adapted to reflect the projection beam to the projection target. The adjusting structure is connected to the reflecting element. The adjusting structure is adapted to drive the reflecting element to rotate along a first axis such that the projection image moves horizontally.

12 Claims, 9 Drawing Sheets

(51) Int. Cl.
*G03B 21/14* (2006.01)
*G03B 35/20* (2006.01)

(58) Field of Classification Search
CPC .... H04N 9/315; H04N 9/3135; H04N 9/3141; H04N 9/3152
See application file for complete search history.

(56) References Cited

U.S. PATENT DOCUMENTS

| | | | |
|---|---|---|---|
| 8,104,898 | B2 | 1/2012 | Liao et al. |
| 8,540,379 | B2 * | 9/2013 | Jikuya .................. G06F 1/1639 348/208.4 |
| 2003/0021037 | A1 | 1/2003 | Nemes |
| 2004/0201824 | A1 | 10/2004 | Wada et al. |
| 2007/0109778 | A1 * | 5/2007 | Chang .................. G03B 21/14 362/220 |
| 2007/0121080 | A1 * | 5/2007 | Hsu .................. G03B 21/2046 353/52 |
| 2008/0240668 | A1 | 10/2008 | Miyata |
| 2011/0157707 | A1 | 6/2011 | Tilleman et al. |
| 2011/0188008 | A1 * | 8/2011 | Maeda .................. G03B 21/28 353/85 |
| 2011/0194035 | A1 | 8/2011 | Aizawa et al. |
| 2015/0022789 | A1 | 1/2015 | Sato |
| 2015/0277123 | A1 * | 10/2015 | Chaum .............. G02B 27/0093 348/62 |
| 2016/0313631 | A1 | 10/2016 | Sugawara et al. |
| 2016/0363746 | A1 | 12/2016 | Minefuji |
| 2017/0184860 | A1 | 6/2017 | Huang |

FOREIGN PATENT DOCUMENTS

| | | |
|---|---|---|
| EP | 2209024 | 7/2010 |
| JP | 2012042654 | 3/2012 |
| KR | 20150039839 | 4/2015 |
| TW | 300288 | 3/1997 |
| TW | I280450 | 5/2007 |
| TW | 200830025 | 7/2008 |
| TW | 201126249 | 8/2011 |
| TW | M433567 | 7/2012 |
| TW | 201704814 | 2/2017 |
| TW | 201715275 | 5/2017 |
| WO | 2017037708 | 3/2017 |

OTHER PUBLICATIONS

"Search Report of Europe Counterpart Application", dated Apr. 29, 2019, pp. 1-8.

"Office Action of Korea Counterpart Application", dated Oct. 31, 2019, p. 1-p. 7.

* cited by examiner

PROJECTION DEVICE WITH ADJUSTING STRUCTURE FOR MOVING DIRECTIONS OF PROJECTION IMAGE

CROSS-REFERENCE TO RELATED APPLICATION

This application claims the priority benefit of China application serial no. 201711394457.5, filed on Dec. 21, 2017. The entirety of the above-mentioned patent application is hereby incorporated by reference herein and made a part of this specification.

BACKGROUND OF THE INVENTION

Field of the Invention

The invention relates to a projection device, and particularly relates to a projection device having an adjusting structure.

Description of Related Art

Currently, the virtual reality technology has been increasingly applied to consumer electronics products, such as a virtual reality display. The virtual reality display uses two projection devices thereof to project two virtual images to human eyes, and the two virtual images are overlapped together to present a stereoscopic image. Particularly, an image beam projected from the projection device is incident into a waveguide sheet for continuous total internal reflection and propagates forward, and finally projected from a light emitting portion of the waveguide sheet. After the image beam with different angle distributions projected from the waveguide sheet enters into the human eyes, the image beam is focused by eye lenses of the human eyes and will focus on the retina to generate a projection image.

In terms of the adjustment manner of the general traditional projection device in non-virtual reality, if the projection device moves horizontally and vertically, the projection image thereof will move horizontally and vertically accordingly; if the projection device rotates horizontally or rotates vertically, the projection image thereof will become a trapezoid (when the ideal projection image is a rectangle). The adjustment manner of the projection device in virtual reality is different from the above. In terms of the projection device in virtual reality, when the image beam with different light emitting angles from the waveguide sheet is transmitted to the human eyes, an image seen by the human eyes is an image of the angle space distribution after converting through the waveguide sheet. If the projection device moves horizontally and vertically, only the incident light energy which is incident to the waveguide sheet will be affected, and the image of the angle space distribution will become dark but without moving accordingly. In order to make the image of the angle space distribution move horizontally and vertically, the angle of the incident light entering into the waveguide sheet should be adjusted. How to comprehensively adjust the projection image of the projection device in virtual reality such that the two virtual images can be overlapped together to present the stereoscopic image is an important issue in the design of the projection device in virtual reality.

The information disclosed in this Description of Related Art is only for enhancement of understanding of the background of the described technology and therefore it may contain information that does not form the prior art that is already known to a person of ordinary skill in the art. Further, the information disclosed in the Description of Related Art does not mean that one or more problems to be resolved by one or more embodiments of the invention were acknowledged by a person of ordinary skill in the art.

SUMMARY OF THE INVENTION

The invention provides a projection device, which can comprehensively adjust movement and rotation of a projection image.

Other objects and advantages of the invention can be further illustrated by the technical features broadly embodied and described as follows.

In order to achieve one, some, or all of the aforementioned objectives or other objectives, an embodiment of the invention provides a projection device including at least one projection module, at least one reflecting element, and at least one adjusting structure. The at least one projection module has at least one optical axis. The at least one projection module is adapted to provide a projection beam. The projection beam is transmitted along a light transmission path to a projection target to form a projection image. The reflecting element is disposed between the at least one projection module and the projection target and located on the optical axis and has a reflecting surface. The reflecting surface is adapted to reflect the projection beam to the projection target. The adjusting structure is connected to the reflecting element. The adjusting structure is adapted to drive the reflecting element to rotate along a first axis such that the projection image moves horizontally.

Based on the above, the embodiments of the invention have at least one of the following advantages or effects. In the projection device of the exemplary embodiment of the invention, the adjusting structure drives the reflecting element to rotate such that the projection image generates corresponding horizontal movement. Additionally, the adjusting structure drives the reflecting element to rotate such that the projection image generates corresponding vertical movement and rotation, and thereby comprehensively adjusting the movement and rotation of the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
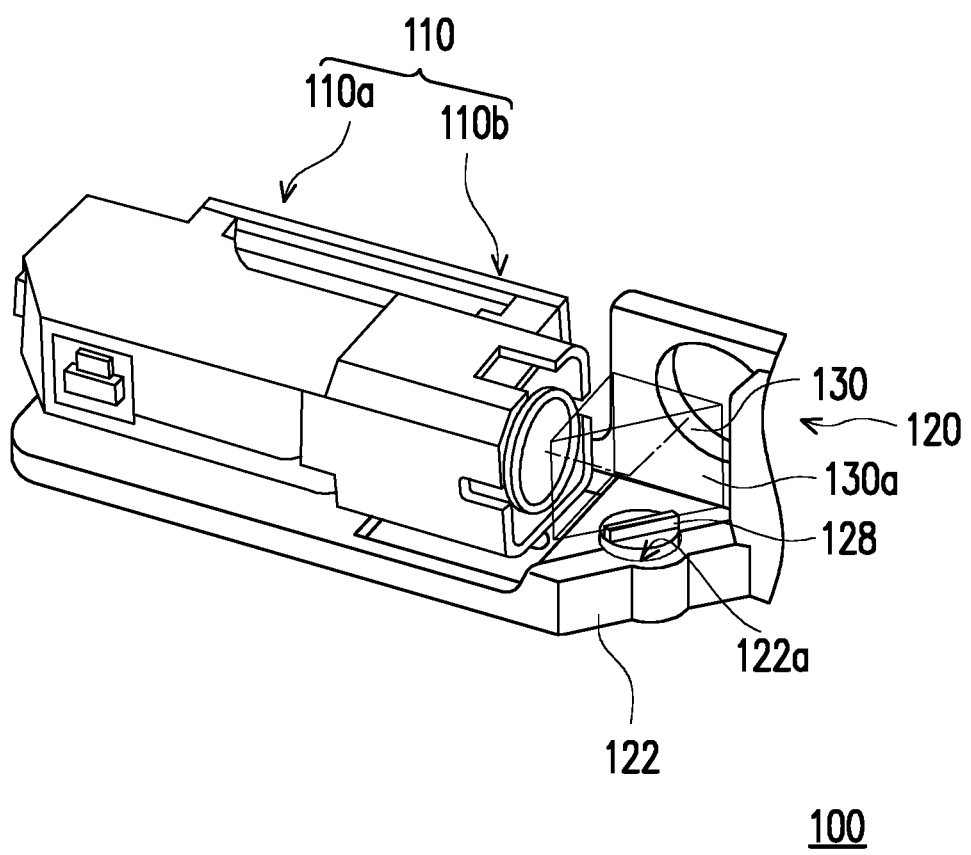
FIG. 1 is a three-dimensional view of a projection device according to an embodiment of the invention.
Figure 2:
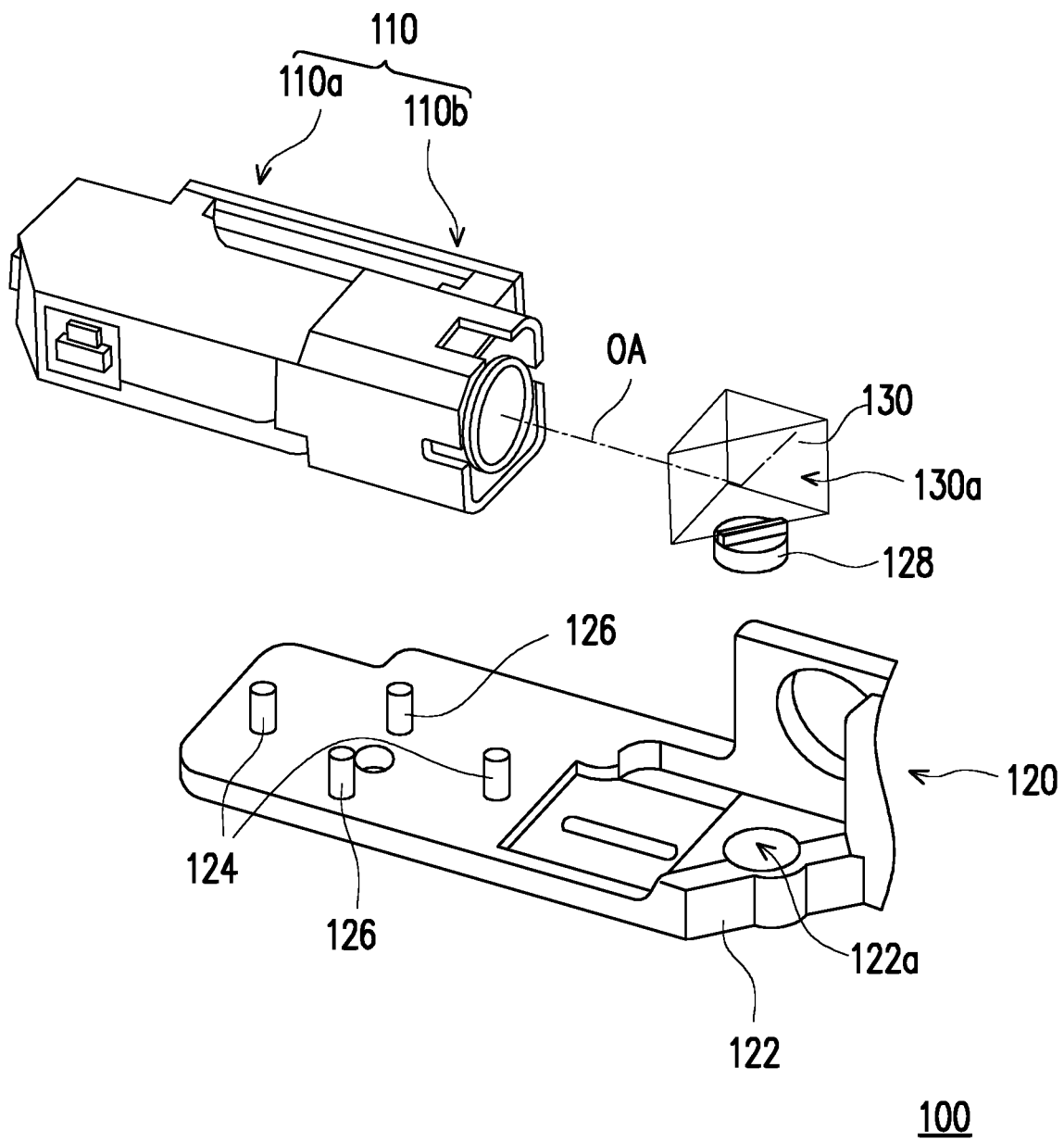
FIG. 2 is an exploded view of the projection device of FIG. 1.

FIG. 1 is a three-dimensional view of a projection device according to an embodiment of the invention. FIG. 2 is an exploded view of the projection device of FIG. 1. Referring to FIG. 1 and FIG. 2, a projection device 100 of the embodiment includes at least one projection module 110 and at least one adjusting structure 120. The adjusting structure 120 is connected to the projection module 110. The projection module 110 includes a projection system 110a and an imaging system 110b. The projection module 110 has an optical axis OA, and the projection module 110 is adapted to provide an image beam. The image beam is transmitted along a light transmission path to a projection target and forms a projection image. The projection image is a virtual image, for example, and the projection target is a human eye, for example.

In the embodiment, the projection device 100 is the projection device in virtual reality, for example. The projection device 100 has one projection module 110. In other embodiments, the number of the projection devices 100 is two, for example (only one projection device 100 is shown in FIG. 1 and FIG. 2), so as to respectively correspond to the eyes of the user. The one projection device 100 has one projection module 120. In other embodiments, the number of the adjusting structures 120 is also two (only one adjusting structure 120 is shown in FIG. 1 and FIG. 2), so as to respectively correspond to the two projection modules 110. The projection image is a virtual image, for example. Each of the adjusting structures 120 is adapted to drive the corresponding projection module 110 to move and rotate such that two projection images formed by the two projection modules 110 are adjusted by the two adjusting structures 120. Thus, the two projection images are overlapped such that the human eyes can see the clear projection image. In other embodiments, it is also possible to use one single projection module 110 to be adjusted by the adjusting structure 120 such that the human eyes can see the clear projection image.

Figure 3:
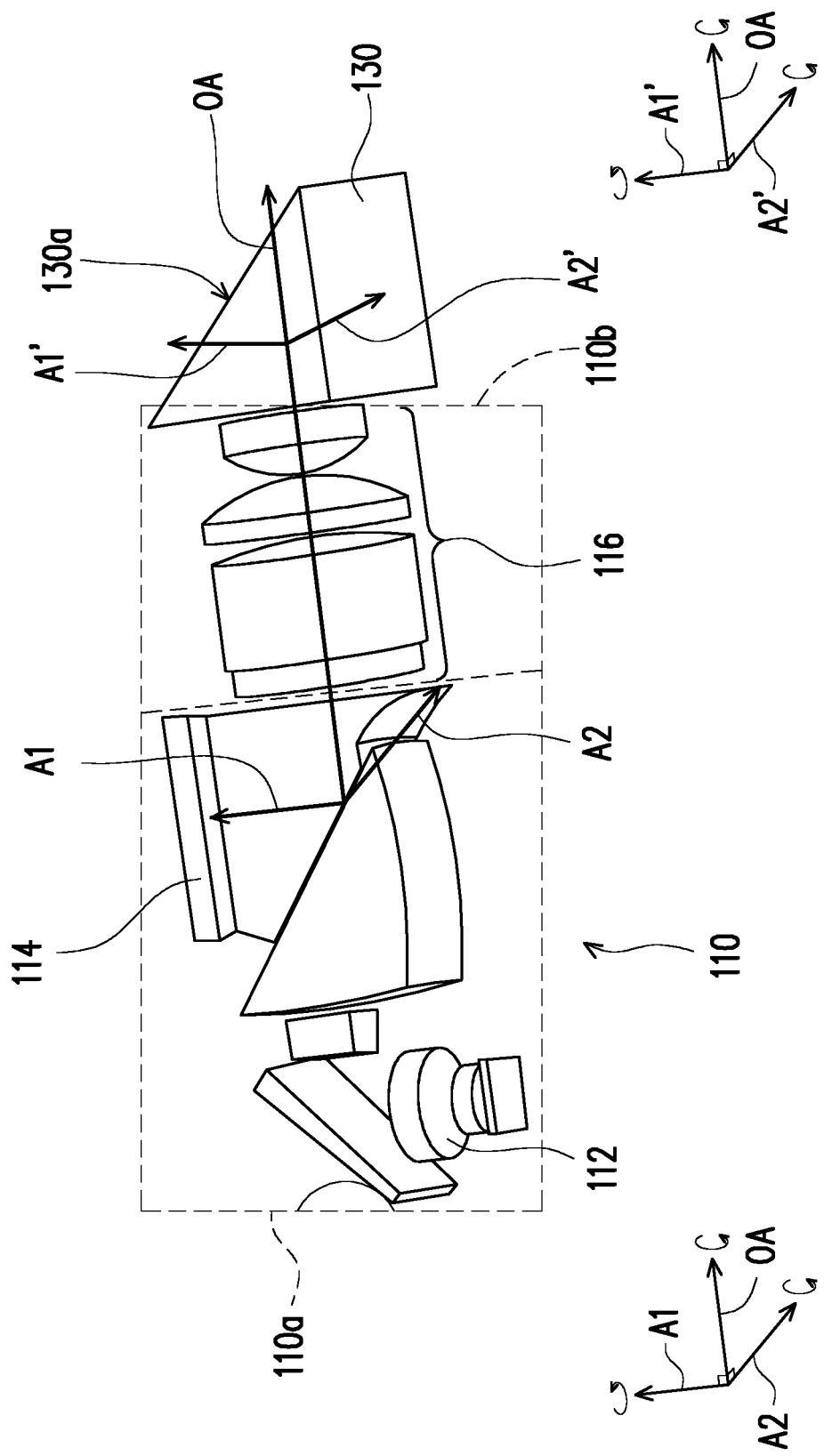
FIG. 3 is a three-dimensional view of some components of the projection device of FIG. 1.

FIG. 3 is a three-dimensional view of some components of the projection device of FIG. 1. Referring to FIG. 3, the projection module 110 of the embodiment includes a light source 112, a light valve 114, and a lens set 116. The projection system 110a includes the light source 112 and the light valve 114. The imaging system 110b includes the lens set 116. The light source 112 is adapted to provide an illumination beam. The light valve 114 is located on a transmission path of the illumination beam and adapted to convert the illumination beam to an image beam. The lens set 116 is located on a transmission path of the image beam and adapted to transmit the image beam to an outside of the projection module 110.

In the embodiment, the light source 112 is a light emitting diode (LED) to provide the illumination beam, for example. In other embodiments, the light source 112 is a laser diode, for example, but is not limited thereto. The light valve 114 is, for example, a reflection type light valve, such as a digital micromirror device (DMD) or a liquid crystal on silicon (LCoS), which is adapted to convert the illumination beam from the light source 112 to the image beam. The lens set 116 has a combination of multiple lenses with different diopters.

Referring to FIG. 3 and FIG. 4A to FIG. 4G, which illustrates movement and rotation of the projection image, FIG. 4A to FIG. 4G represent a projection image I received at a projection target. The projection module 110 has a first adjusting center, i.e., an intersection point of a first axis A1, a second axis A2, and the optical axis OA, where is a non-physical center, wherein the first axis A1, the second axis A2, and the optical axis OA are perpendicular to each other. The adjusting structure 120 is adapted to drive the projection system 110a and the imaging system 110b to rotate together along the first axis A1 such that the projection image I can move horizontally from the state shown in FIG. 4A to the state shown in FIG. 4B or FIG. 4C. The aforementioned projection image I is an example. In other cases, the projection image I may be adjusted from the state shown in FIG. 4C to the state shown in FIG. 4B according to the user using the adjusting structure 120, but the invention is not limited thereto. Additionally, the adjusting structure 120 is adapted to drive the projection system 110a and the imaging system 110b to rotate together along the second axis A2 such that the projection image I moves vertically from the state shown in FIG. 4A to the state shown in FIG. 4D or FIG. 4E, and the adjusting structure 120 is adapted to drive the projection module 110 to rotate along the optical axis OA such that the projection image I rotates from the state shown in FIG. 4A to the state shown in FIG. 4F or FIG. 4G.

Figure 5:
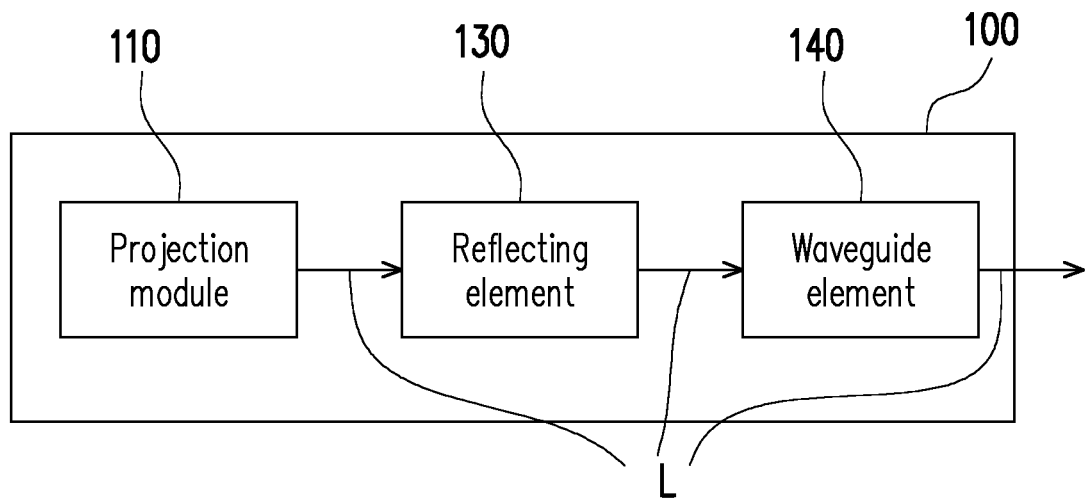
FIG. 5 is a schematic view of some components of the projection device of FIG. 1.

FIG. 5 is a schematic view of some components of the projection device of FIG. 1. In the embodiment, the projection device 100 further includes a reflecting element 130 and a waveguide element 140 shown in FIG. 5. The reflecting element 130 is disposed on the optical axis OA and has a reflecting surface 130a. The reflecting surface 130a is adapted to reflect the image beam (FIG. 5 indicates an image beam L). The image beam is reflected to the projection target by the reflecting surface 130a after passing through the waveguide element 140 to form the projection image I. The reflecting element 130 is, for example, a total internal reflection prism and the number thereof is two, for example, so as to respectively correspond the aforementioned two projection modules 110. Additionally, the waveguide element 140 is a transparent sheet or a transparent plate, for example, and may be formed by a single or multiple transparent sheet(s) or transparent plate(s). The waveguide element 140 may have a beam splitter film or a hologram therein, which is adapted to change a pathway direction of the image beam, but the invention is not limited thereto.

Figure 6:
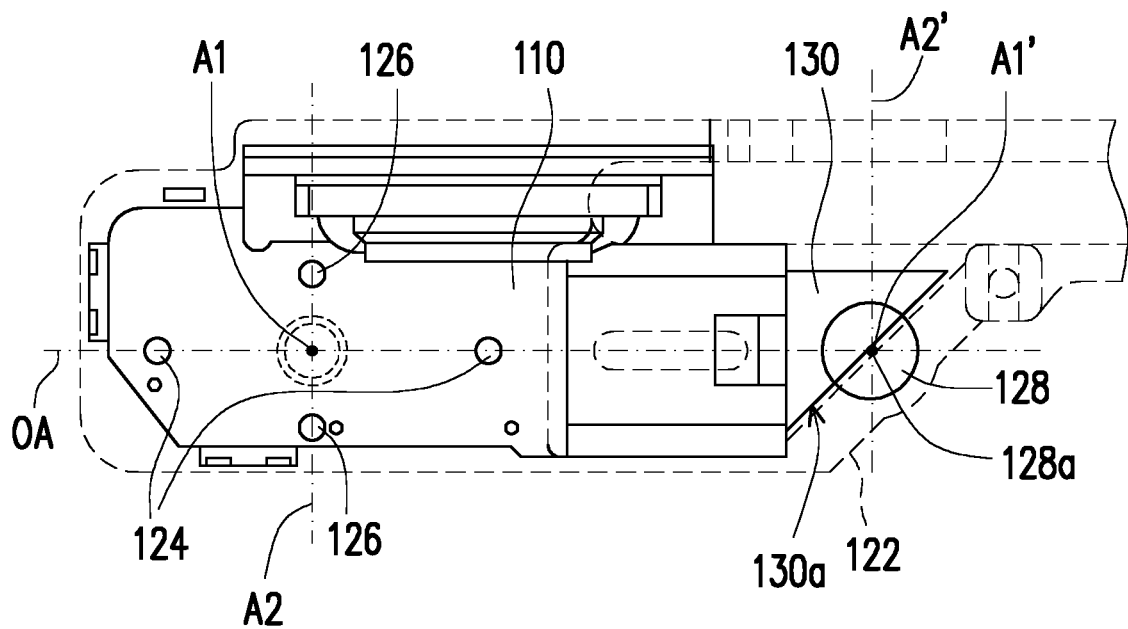
FIG. 6 is a bottom view of some components of the projection device of FIG. 1.
Figure 7:
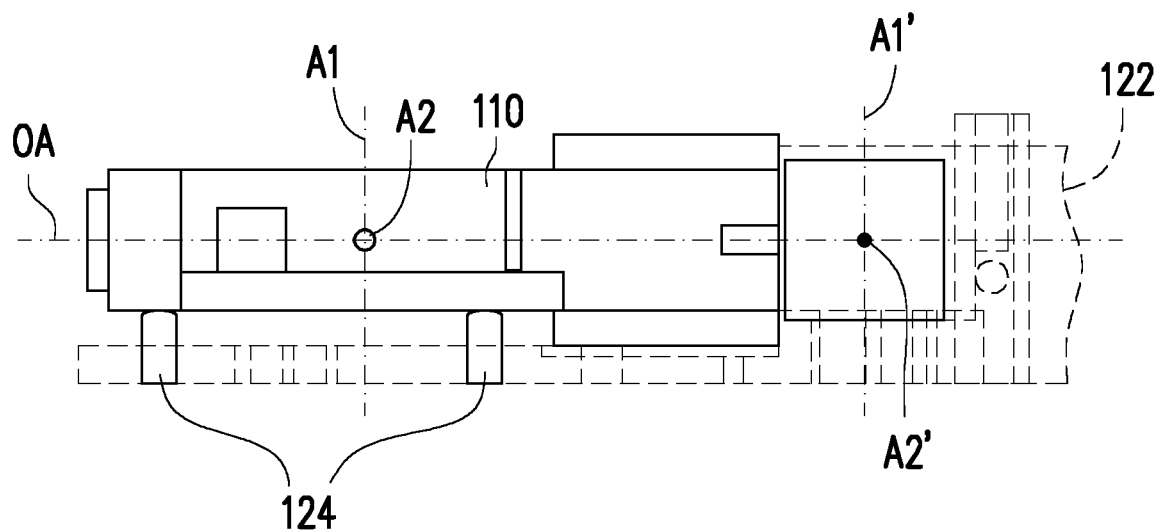
FIG. 7 is a side view of some components of the projection device of FIG. 1.
Figure 8:
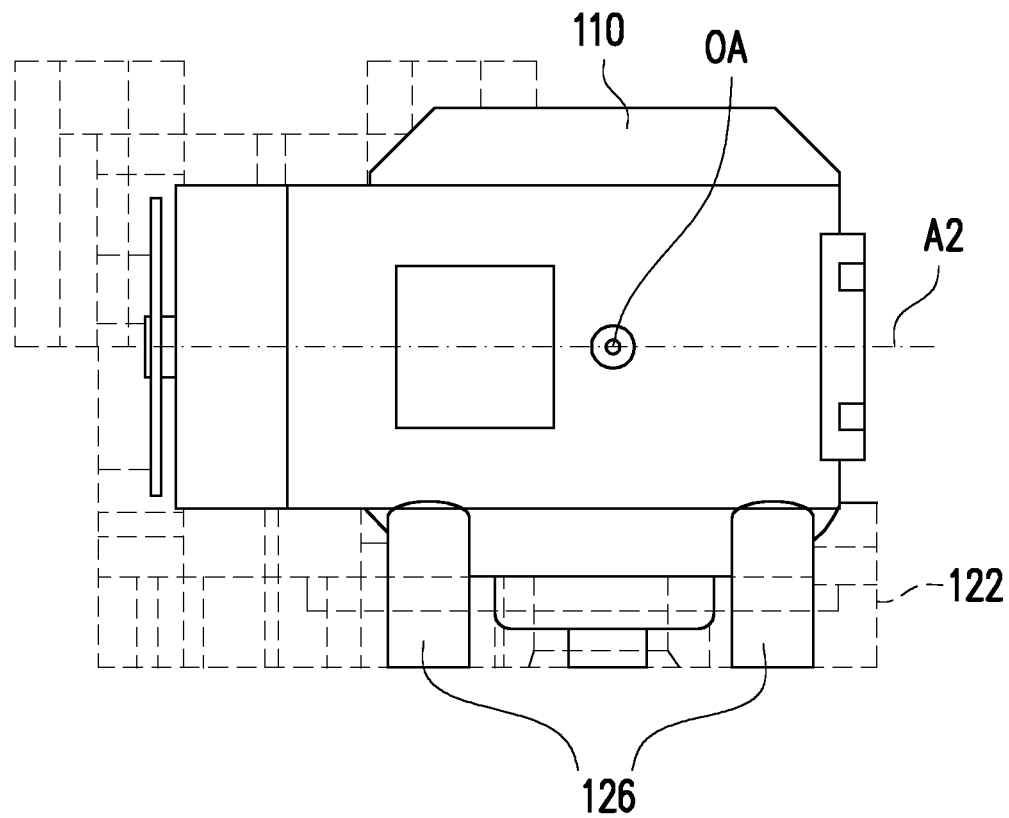
FIG. 8 is a back view of some components of the projection device of FIG. 1.

The following is a specific illustration of the adjusting structure 120 of the embodiment to perform the aforementioned adjusting manner. FIG. 6 is a bottom view of some components of the projection device of FIG. 1. FIG. 7 is a side view of some components of the projection device of FIG. 1. FIG. 8 is a back view of some components of the projection device of FIG. 1. Referring to FIG. 2, FIG. 3, and FIG. 6 to FIG. 8, the adjusting structure 120 of the embodiment includes a base 122 and two first adjusting elements 124. Each of the first adjusting elements 124 is a screw, for example, which is screwed to and passes through the base 122 and abuts against the projection module 110. Each of the first adjusting elements 124 is adapted to rotate to move up and down relative to the base 122, so as to drive the projection system 110a and the imaging system 110b (i.e., the light source 112, the light valve 114, and the lens set 116) to rotate along the second axis A2. In the embodiment, a connecting line of the two first adjusting elements 124 is parallel to the optical axis OA, so as to drive the projection system 110a and the imaging system 110b to rotate along the second axis A2 perpendicular to the optical axis OA indeed. Additionally, in another embodiment, the first adjusting center is located between the two first adjusting elements 124, and the first adjusting center has the same distance between the two first adjusting elements 124.

Additionally, the adjusting structure 120 includes two second adjusting elements 126. Each of the second adjusting elements 126 is a screw, for example, which is screwed to and passes through the base 122 and abuts against the projection module 110. The two second adjusting elements 126 are symmetrical to the optical axis OA. Each of the second adjusting elements 126 is adapted to rotate to move up and down relative to the base 122, so as to drive the projection system 110a and the imaging system 110b (i.e., the light source, the light valve 114, and the lens set 116) to rotate along the optical axis OA. In another embodiment, the first adjusting center is located between the two second adjusting elements 126, and the first adjusting center has the same distance between the two second adjusting elements 126. Additionally, the adjusting structure 120 may drive the projection system 110a and the imaging system 110b to rotate along the first axis A1 according to the manner similar to the first adjusting element 124 and the second adjusting element 126, which is using the movement of other adjusting elements relative to the base 122. For instance, a rotating disc is disposed at a bottom of the base 122, which is adapted to drive the entire of the projection system 110a and the imaging system 110b to rotate along the first axis A1, to achieve moving horizontally from the state shown in FIG. 4A to the state shown in FIG. 4B or FIG. 4C.

In the embodiment, an adjusting direction of the first adjusting element 124 or the second adjusting element 126 to move up and down relative to the base 122 is perpendicular to the optical axis OA of the projection module 110.

In the embodiment, alternatively, the projection image I may be adjusted by driving the reflecting element 130 as described below. Referring to FIG. 2 and FIG. 3 to FIG. 6, the adjusting structure 120 may be connected to the reflecting element 130 such that the adjusting structure 120 can drive the reflecting element 130 to rotate along another first axis A1', and thus the projection image I can move horizontally from the state shown in FIG. 4A to the state shown in FIG. 4B or FIG. 4C. The adjusting structure 120 can drive the reflecting element 130 to rotate along another second axis A2' and rotate along the optical axis OA such that the projection image I moves vertically from the state shown in FIG. 4A to the state shown in FIG. 4D or FIG. 4E and rotates from the state shown in FIG. 4A to the state shown in FIG. 4F or FIG. 4G simultaneously.

Figure 4D:
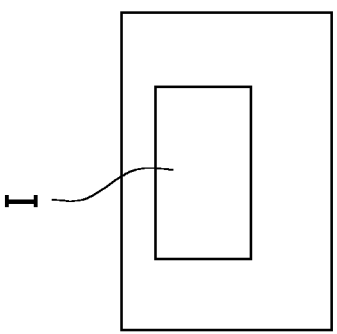
FIG. 4A to FIG. 4G illustrates movement and rotation of a projection image.
Figure 4C:
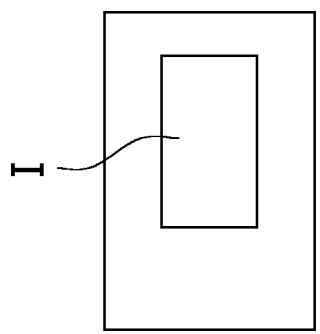
Figure 4B:
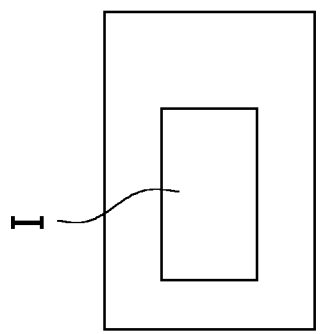
Figure 4A:
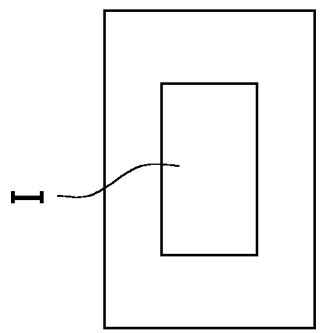
Figure 4G:
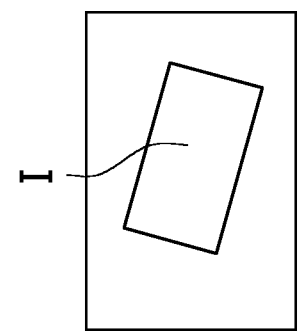
Figure 4F:
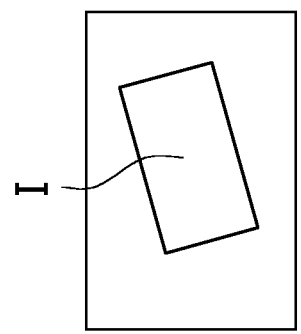
Figure 4E:
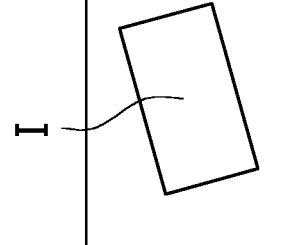

In other embodiments, the adjusting structure 120 can drive the reflecting element 130 to rotate along another second axis A2' such that the projection image I moves vertically from the state shown in FIG. 4A to the state shown in FIG. 4D or FIG. 4E and rotates from the state shown in FIG. 4A to the state shown in FIG. 4F or FIG. 4G simultaneously.

In other embodiments, the adjusting structure 120 can drive the reflecting element 130 to rotate along the optical axis OA such that the projection image I moves vertically from the state shown in FIG. 4A to the state shown in FIG. 4D or FIG. 4E and rotates from the state shown in FIG. 4A to the state shown in FIG. 4F or FIG. 4G simultaneously.

In the embodiment, the first axis A1', the second axis A2', and the optical axis OA are perpendicular to each other. The first axis A1', the second axis A2', and the optical axis OA intersect at a reflecting position on the reflecting surface 130a. The reflecting position is located at a geometric center of the reflecting surface 130a. In an embodiment, the reflecting element 130 may be a prism. The reflecting surface 130a may be a total internal reflection surface of the prism. In other embodiments, a reflecting layer can be coated or a reflecting sheet can be pasted to be the reflecting surface 130a.

The following is a specific illustration of the adjusting structure 120 of the embodiment to perform the aforementioned adjusting manner. The adjusting structure 120 further includes a rotating member 128. The rotating member 128 is connected to the reflecting element 130 and pivoted to the base 122 along a rotating shaft 128a (as shown in FIG. 6). The rotating shaft 128a coincides with the first axis A1'. The rotating member 128 is adapted to rotate relative to the base 122 to drive the reflecting element 130 to rotate along the first axis A1'. In the embodiment, the rotating member 128 is fixed at a bottom of the reflecting element 130 and pivoted to a pivot hole 122a of the base 122, for example. In an embodiment, a strip-shaped protruding element is disposed at an intermediate position of the rotating member 128 to fix the position of the reflecting element 130. An adhesive, such as an optical cement, is used to fix the rotating member 128 to a part of the bottom and a part of the reflecting surface 130a of the reflecting element 130. Thus, when the rotating member 128 rotates, a rotating angle of the reflecting element 130 will be consistent with a rotating angle of the rotating member 128, and an angular tolerance is not generated when assembling between two elements. In other embodiments, the rotating member 128 may be disposed according to other suitable manners, but the invention is not limited thereto. Additionally, the adjusting structure 120 may drive the reflecting element 130 to rotate along the second axis A2' and the optical axis OA according to the manner similar to the rotating member 128, which is using the rotation or the movement of other adjusting elements relative to the base 122. In another embodiment, an intersection point of the first axis A1', the second axis A2', and the optical axis OA is a second adjusting center, where is a non-physical center, wherein the first axis A1', the second axis A2', and the optical axis OA are perpendicular to each other.

In the embodiment, alternatively, the projection image I may be adjusted by driving the projection module 110 and the reflecting element 130 to move and rotate together as described below. The adjusting structure 120 can drive the projection module 110 and the reflecting element 130 to rotate together along the first axis A1 such that the projection image I moves horizontally from the state shown in FIG. 4A to the state shown in FIG. 4B or FIG. 4C. The adjusting structure 120 can drive the projection module 110 and the reflecting element 130 to rotate together along the second axis A2 such that the projection image I rotates from the state shown in FIG. 4A to the state shown in FIG. 4F or FIG. 4G. The adjusting structure 120 can drive the projection module 110 and the reflecting element 130 to rotate together along the optical axis OA such that the projection image I moves vertically from the state shown in FIG. 4A to the state shown in FIG. 4D or FIG. 4E. The adjusting structure 120 may achieve the aforementioned adjustment using other adjusting elements according to the manner similar to the first adjusting element 124 and the second adjusting element 126 or the manner similar to the rotating member 128.

For instance, in the embodiment, at least one adjusting structure 120 is connected to the projection module 110 and the reflecting element 130. Further explanation, the projection module 110 and the reflecting element 130 therebetween may be adhered together using an adhesion manner, such as using an adhesive (e.g., an optical cement), but is not limited thereto. The adjusting structure 120 is adapted to abut against the projection module 110 such that the projection module 110 and the reflecting element 130 has an entire adjustment.

In another embodiment, the projection device 100 further includes a fixing member (not shown), which is disposed between the projection module 110 and the reflecting element 130. The fixing member is adapted to fix and connect the reflecting element 130 to a light emitting side of the projection module 110. Additionally, the adjusting structure 120 is adapted to abut against the projection module 110 such that the projection module 110, the fixing member, and the reflecting element 130 has an entire adjustment. Any fixing structure between the projection module 110 and the reflecting element 130 can be used in the invention, and the invention is not limited thereto.

For instance, in an embodiment of the invention, the adjusting structure 120 includes one of the base 122 and two of the first adjusting elements 124. Each of the first adjusting elements 124 is screwed to the base 122 and abuts against the projection module 110. The connecting line of the two first adjusting elements 124 is parallel to the optical axis OA. Each of the first adjusting elements 124 is adapted to rotate to move relative to the base 122, so as to drive the light source 112, the light valve 116, the lens set 116, and the reflecting element 130 to rotate along the second axis A2. Since the projection module 110 and the reflecting element 130 therebetween has the fixing member or are adhered together using the adhesion manner, the first adjusting element 124 can drive the projection module 110 and the reflecting element 130 to rotate along the second axis A2 simultaneously when being adapted to rotate to move relative to the base 122.

For instance, in another embodiment of the invention, the adjusting structure 120 includes two of the second adjusting elements 126. Each of the second adjusting elements 126 is screwed to the base 122 and abuts against the projection module 110. The two second adjusting elements 126 are symmetrical to the optical axis OA. Each of the second adjusting elements 126 is adapted to rotate to move relative to the base 122, so as to drive the light source 112, the light valve 116, the lens set 116, and the reflecting element 130 to rotate along the optical axis OA. Since the projection module 110 and the reflecting element 130 therebetween has the fixing member or are adhered together using the adhesion manner, the second adjusting element 126 can drive the projection module 110 and the reflecting element 130 to rotate along the optical axis OA simultaneously when being adapted to rotate to move relative to the base 122.

For instance, in another embodiment of the invention, the rotating disc is disposed at the bottom of the base 122 (not shown), which is adapted to drive the entire of the projection module 110 and the reflecting element 130 to rotate along the first axis A1, and the projection image I rotating from the state shown in FIG. 4A to the state shown in FIG. 4B or FIG. 4C can be achieved.

Figure 9:
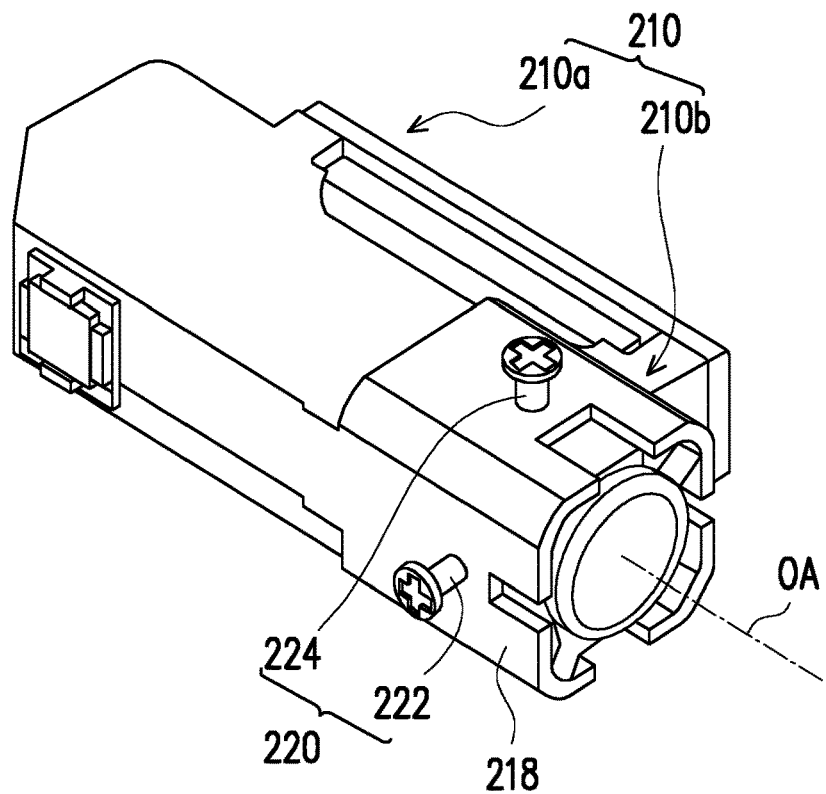
FIG. 9 is a three-dimensional view of some components of the projection device according to another embodiment of the invention.
Figure 10:
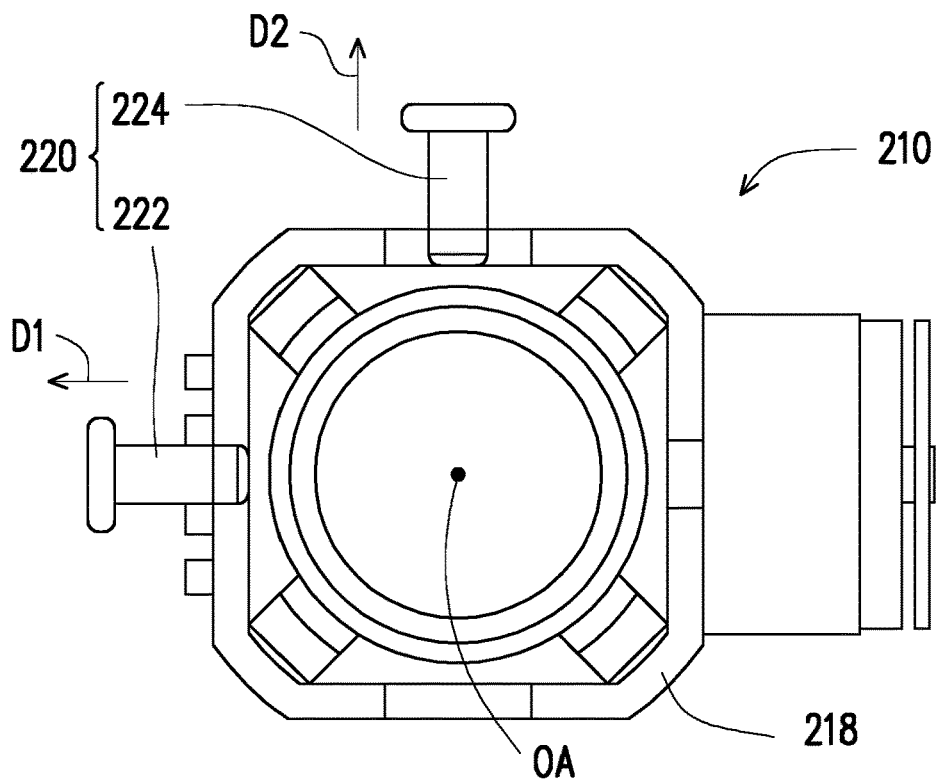
FIG. 10 is a front view of the projection device of FIG. 9.
Figure 11:
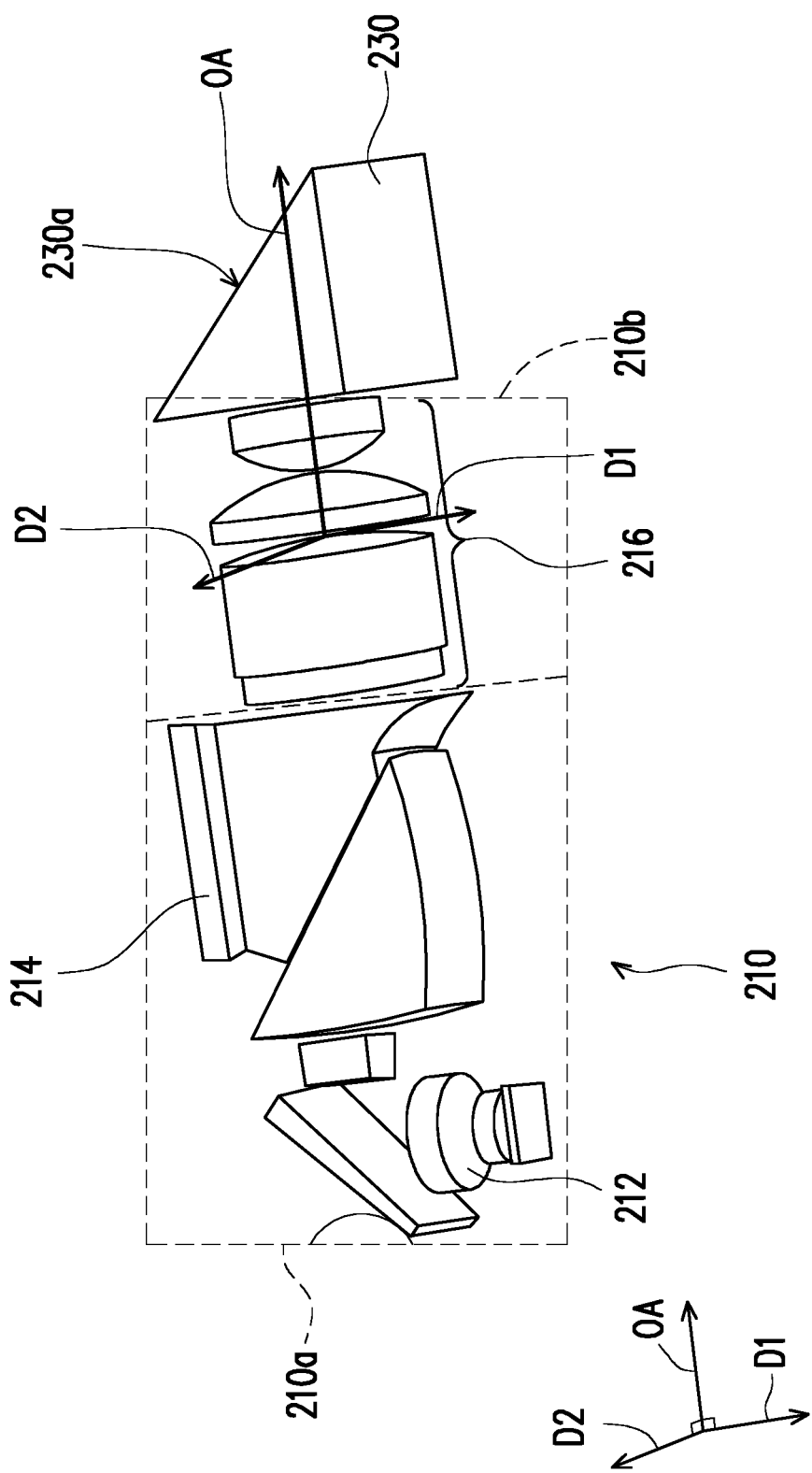
FIG. 11 is a three-dimensional view of some components of the projection device of FIG. 9.

FIG. 9 is a three-dimensional view of some components of the projection device according to another embodiment of the invention. FIG. 10 is a front view of the projection device of FIG. 9. FIG. 11 is a three-dimensional view of some components of the projection device of FIG. 9. In the embodiments shown in FIG. 9 to FIG. 11, the configurations and functions of a projection module 210, a projection system 210a, an imaging system 210b, a light source 212, a light valve 214, a lens set 216, a reflecting element 230, and a reflecting surface 230a are similar to those of the embodiments shown in FIG. 1 to FIG. 8, and thus details thereof are not repeated hereinafter. A difference between the embodiments shown in FIG. 9 to FIG. 11 and the embodiments shown in FIG. 1 to FIG. 8 is that the adjusting structure 220 can drive the imaging system 210b to move along a first direction D1 such that the projection image I moves horizontally from the state shown in FIG. 4A to the state shown in FIG. 4B or FIG. 4C. The adjusting structure 220 can drive the imaging system 210b to move along a second direction D2 such that the projection image I moves vertically from the state shown in FIG. 4A to the state shown in FIG. 4D or FIG. 4E, and the adjusting structure 220 can drive the projection system 210a to rotate along the optical axis OA such that the projection image I rotates from the state shown in FIG. 4A to the state shown in FIG. 4F or FIG. 4G. In the embodiment, the first direction D1, the second direction D2, and the optical axis OA are perpendicular to each other.

Referring to FIG. 9 to FIG. 11, the following is a specific illustration of the adjusting structure 220 of the embodiment to perform the aforementioned adjusting manner. In the embodiment, the projection module 210 includes an outer shell 218. The adjusting structure 220 includes a third adjusting element 222 and a fourth adjusting element 224. The third adjusting element 222 is a screw, for example, which is screwed to the outer shell 218 and abuts against the lens set 216. The fourth adjusting element 224 is a screw, for example, which is screwed to the outer shell 218 and abuts against the lens set 216. The third adjusting element 222 is adapted to rotate to move relative to the outer shell 218, so as to drive the lens set 216 to move along the first direction D1. The fourth adjusting element 224 is adapted to rotate to move relative to the outer shell 218, so as to drive the lens set 216 to move along the second direction D2. The first direction D1 and the second direction D2 are perpendicular to each other. Additionally, the third adjusting element 222 and the fourth adjusting element 224 may be respectively provided with a corresponding elastic element at an opposite side of the lens set 216, such as an elastic strip, which can be used to generate elastic force. The elastic force and thrust of the third adjusting element 222 and the fourth adjusting element 224 achieve force balance with each other such that the lens set 216 will not move after adjusting the position.

Figure 12:
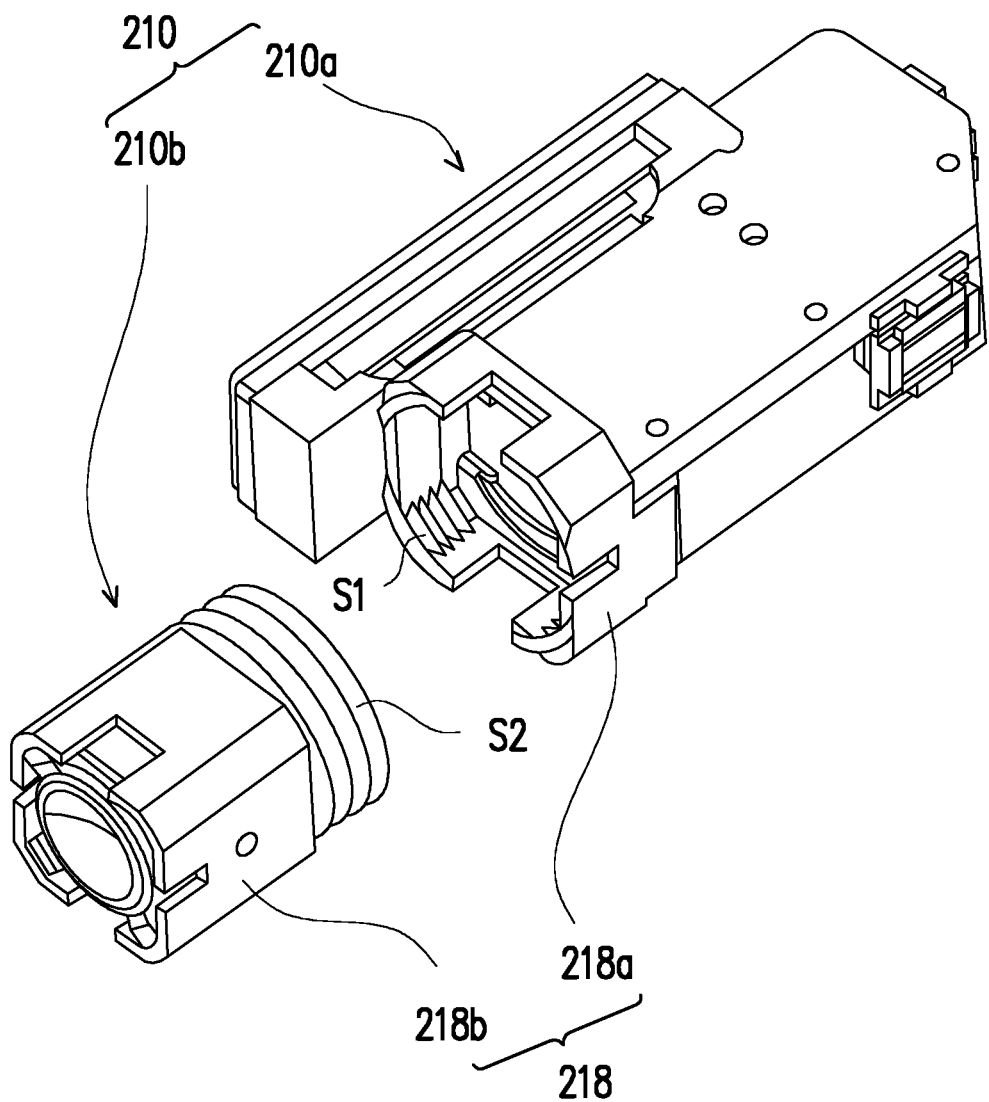
FIG. 12 is a three-dimensional view of some components of the projection device according to yet another embodiment of the invention.

In the embodiment, the outer shell 218 may include two shell bodies which are able to rotate relative to each other and respectively correspond to the projection system 210a and the imaging system 210b. Thus, the projection system 210a may rotate along the optical axis OA relative to the imaging system 210b. It will be described below with reference to the figures. FIG. 12 is a three-dimensional view of some components of the projection device according to yet another embodiment of the invention. The outer shell 218 of the projection module 210 shown in FIG. 12 includes a first shell body 218a and a second shell body 218b. The first shell body 218a is rotatably connected to the second shell body 218b. The projection system 210a (i.e., the light source and the light valve) is disposed in the first shell body 218a. The imaging system 210b (i.e., the lens set) is disposed in the second shell body 218b. The first shell body 218a is adapted to rotate relative to the second shell body 218b to drive the projection system 210a (i.e., the light source and the light valve) to rotate along the optical axis OA. Particularly, the first shell body 218a has a first threaded portion S1. The second shell body 218b has a second threaded portion S2. The first threaded portion S1 and the second threaded portion S2 are screwed to each other such that the first shell body 218a is adapted to rotate relative to the second shell body 218b. In other words, the second shell body 218b does not move and the first shell body 218a rotates such that the projection system 210a (i.e., the light source and the light valve) rotates along the optical axis OA, and the projection image I rotating from the state shown in FIG. 4A to the state shown in FIG. 4F or FIG. 4G can be achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising at least one projection module, at least one reflecting element, and at least one adjusting structure,
    the at least one projection module having at least one optical axis, the at least one projection module being adapted to provide a projection beam, wherein the projection beam is transmitted along a light transmission path to a projection target and forms a projection image;
    the at least one reflecting element being disposed between the at least one projection module and the projection target and located on the optical axis and having a reflecting surface, wherein the reflecting surface is adapted to reflect the projection beam to the projection target;
    the at least one adjusting structure being connected to the reflecting element, wherein the adjusting structure is adapted to drive the reflecting element to rotate along a first axis such that the projection image moves horizontally.

2. The projection device as claimed in claim 1, wherein the adjusting structure is adapted to drive the reflecting element to rotate along a second axis and rotate along the optical axis such that the projection image moves vertically and rotates.

3. The projection device as claimed in claim 2, wherein the first axis, the second axis, and the optical axis are perpendicular to each other.

4. The projection device as claimed in claim 2, wherein the first axis, the second axis, and the optical axis intersect at a reflecting position on the reflecting surface.

5. The projection device as claimed in claim 4, wherein the reflecting position is located at a geometric center of the reflecting surface.

6. The projection device as claimed in claim 2, wherein the projection module comprises a light source, a light valve, and a lens set, the light source is adapted to provide an illumination beam, the light valve is located on a transmission path of the illumination beam and adapted to convert the illumination beam to an image beam, and the lens set is located on a transmission path of the image beam and adapted to convert the image beam to the projection beam.

7. The projection device as claimed in claim 1, wherein the adjusting structure comprises a base and a rotating member, the rotating member is connected to the reflecting element and pivoted to the base along a rotating shaft, the rotating shaft coincides with the first axis, and the rotating member is adapted to rotate relative to the base to drive the reflecting element to rotate along the first axis.

8. The projection device as claimed in claim 1, wherein the projection device comprises at least one waveguide element, wherein the projection beam reflected by the reflecting element forms the projection image after passing through the at least one waveguide element.

9. The projection device as claimed in claim 1, wherein the projection image is a virtual image.

10. The projection device as claimed in claim 1, wherein the at least one projection module comprises two of the projection modules, the at least one reflecting element comprises two of the reflecting elements respectively corresponding to the two of the projection modules, the at least one adjusting structure comprises two of the adjusting structures respectively corresponding to the two of the reflecting elements, and two of the projection images formed by the two of the projection modules and the two of the reflecting elements are overlapped by an adjustment of the two of the adjusting structures.

11. The projection device as claimed in claim 1, wherein the adjusting structure is adapted to drive the reflecting element to rotate along a second axis such that the projection image moves vertically and rotates.

12. The projection device as claimed in claim 1, wherein the adjusting structure is adapted to drive the reflecting element to rotate along the optical axis such that the projection image moves vertically and rotates.

* * * * *